US011711131B2

(12) United States Patent
Jiang

(10) Patent No.: US 11,711,131 B2
(45) Date of Patent: *Jul. 25, 2023

(54) INFORMATION TRANSMISSION METHOD AND INFORMATION TRANSMISSION DEVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO. LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,058

(22) Filed: Dec. 27, 2021

(65) Prior Publication Data
US 2022/0123820 A1 Apr. 21, 2022

Related U.S. Application Data

(63) Continuation of application No. 16/978,176, filed as application No. PCT/CN2018/080956 on Mar. 28, 2018, now Pat. No. 11,245,458.

(51) Int. Cl.
H04B 7/06 (2006.01)
H04W 74/00 (2009.01)
(Continued)

(52) U.S. Cl.
CPC ........ *H04B 7/0695* (2013.01); *H04W 74/004* (2013.01); *H04W 74/0833* (2013.01); *H04W 76/19* (2018.02)

(58) Field of Classification Search
CPC .............. H04B 7/0695; H04W 74/004; H04W 74/0833; H04W 76/19
See application file for complete search history.

(56) References Cited

U.S. PATENT DOCUMENTS 10,826,592 B2   11/2020  Fan et al.
11,245,458 B2*   2/2022  Jiang ..................... H04W 76/19
(Continued)

FOREIGN PATENT DOCUMENTS

CN    102123458 A    7/2011
CN    102238750 A    11/2011
(Continued)

OTHER PUBLICATIONS

International Search Report in the international application No. PCT/CN2018/080956, dated Jan. 3, 2019.
(Continued)

*Primary Examiner* — Harry H Kim
(74) *Attorney, Agent, or Firm* — Syncoda LLC; Feng Ma

(57) ABSTRACT

An information transmission method can be applied to a user equipment, and include: when a beam failure recovery procedure is initiated for a first cell, initiating random access to a base station through a second cell, wherein the second cell is the first cell or another cell other than the first cell; and if the number of times random access is initiated without being able to complete the random access reaches a preset number, transmitting to the base station indication information for a problem existing in a cell group where the second cell is located, wherein the indication information is used to indicate that the cause for the problem existing in the cell group is the failure of random access caused by the initiation of the beam failure recovery procedure.

18 Claims, 6 Drawing Sheets

(51) Int. Cl.
*H04W 74/08* (2009.01)
*H04W 76/19* (2018.01)

(56) References Cited

U.S. PATENT DOCUMENTS

| | | | |
|---|---|---|---|
| 2012/0281548 | A1 | 11/2012 | Lin |
| 2013/0003700 | A1 | 1/2013 | Zhang |
| 2014/0128058 | A1 | 5/2014 | Ji et al. |
| 2015/0045035 | A1* | 2/2015 | Nigam .............. H04W 72/1268 455/436 |
| 2015/0256300 | A1 | 9/2015 | Lin et al. |
| 2016/0150435 | A1 | 5/2016 | Baek et al. |
| 2017/0195027 | A1 | 7/2017 | Baek et al. |
| 2018/0049177 | A1 | 2/2018 | Islam et al. |
| 2018/0054348 | A1 | 2/2018 | Luo et al. |
| 2019/0069220 | A1 | 2/2019 | Kim |
| 2019/0200391 | A1 | 6/2019 | Li et al. |
| 2019/0253949 | A1* | 8/2019 | Park ..................... H04B 7/0695 |
| 2020/0052767 | A1 | 2/2020 | Wang et al. |
| 2020/0178141 | A1 | 6/2020 | Lee et al. |
| 2020/0187258 | A1 | 6/2020 | Lee et al. |
| 2020/0367293 | A1* | 11/2020 | Zhang .................. H04W 76/19 |
| 2021/0014920 | A1 | 1/2021 | Chen et al. |
| 2021/0068162 | A1* | 3/2021 | Agiwal .............. H04L 41/0668 |
| 2021/0092775 | A1* | 3/2021 | Uchino ................ H04W 74/02 |

FOREIGN PATENT DOCUMENTS

| | | |
|---|---|---|
| CN | 102870450 A | 1/2013 |
| CN | 102883361 A | 1/2013 |
| CN | 106685505 A | 5/2017 |
| CN | 107079459 A | 8/2017 |
| CN | 107690162 A | 2/2018 |
| WO | 2016085266 A1 | 6/2016 |

OTHER PUBLICATIONS

3GPP TS 36.321 V15.0.0 (Dec. 2017), 3rd Generation Partnership Project; Technical Specification Group Radio Access Network; Evolved Universal Terrestrial Radio Access (E-UTRA); Medium Access Control (MAC) protocol specification (Release 15).
3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15).
Vivo, Remaining issues of beam failure recovery and corresponding TP, 3GPP TSG-RAN WG2 Meeting #101 R2-1802085, Feb. 14, 2018 (Feb. 14, 2018), Section 2.
Huawei, non-contention based random access for beam failure recovery in CA, 3GPP TSG-RAN WG2#AH-1801 R2-1801049, Jan. 12, 2018 (Jan. 12, 2018), Section 2.
Xiaomi, Random access failure consideration for SUL, 3GPP TSG-RAN2 NR AH-1801 R2-1800236, Jan. 12, 2018 (Jan. 12, 2018), Section 2.
Ericsson, RLF handling in dual connectivity, 3GPP TSG-RAN WG2 #85 R2-140655, Feb. 1, 2014 (Feb. 1, 2014), Section 2.
Huawei, RLF with beam failure recovery, 3GPP TSG-RAN WG2#AH-1801 R2-1800513, Jan. 11, 2018 (Jan. 11, 2018), Section 2.
First Office Action of the Chinese application No. 201880000512.4, dated Oct. 9, 2020.
Written Opinion of the International Search Authority in the international application No. PCT/CN2018/080956, dated Jan. 3, 2019.
3GPP TSG RAN WG2 Meeting #101 R2-1802071, Athens, Greece, Feb. 26-Mar. 2, 2018, Agenda item: 10.2.8., Source: Nokia, Nokia Shanghai Bell, Title: Impact of Beam Failure Recovery on RLF related actions, WID/SID: NR_newRAT-Core-Release 15, Document for: Discussion and Decision.
3GPP TSG-RAN WG2 #AH NR 1801 Tdoc R2-1800340, Vancouver, Canada, Jan. 22-26, 2018, Agenda Item: 10.3.1.13, Source: Ericsson, Title: Contention based random access for beam failure recovery, Document for: Discussion, Decision.
3GPP TSG-RAN WG2 Meeting #98 R2-1704997, Hangzhou, China, May 15-19, 2017, Source: CATT, Title: Beam Recovery Failure and RLF, Agenda Item:10.2.8, Document for: Discussion and Decision.
Supplementary European Search Report in the European application No. 18912387.0, dated Nov. 8, 2021.
Notice of Allowance of the U.S. Appl. No. 16/978,176, dated Oct. 1, 2021.
Office Action of the Indian application No. 202047046664, dated Dec. 8, 2021.
"3rd Generation Partnership Project; Technical Specification Group Radio Access Network; NR; Medium Access Control (MAC) protocol specification (Release 15)", 3GPP TS 38.321 V2.0.0 (Dec. 2017).

* cited by examiner

INFORMATION TRANSMISSION METHOD AND INFORMATION TRANSMISSION DEVICE

CROSS-REFERENCE TO RELATED APPLICATIONS

This is a continuation of U.S. patent application Ser. No. 16/978,176 filed on Sep. 3, 2020, which is a national stage application of International Application No. PCT/CN2018/080956 filed on Mar. 28, 2018. The disclosures of the above-referenced applications are hereby incorporated by reference in their entirety.

BACKGROUND

In a New Radio (NR) system, a base station may communicate with a user equipment (UE) through beam sweeping, and the UE may monitor a certain cell for signal quality of beams. When it is detected that the signal quality of a beam does not meet the requirements, a physical layer of the UE will indicate beam failure to a Media Access Control (MAC) layer. When the number of times of beam failure indicated by the physical layer reaches a certain number, the MAC layer may trigger a Beam Failure Recovery (BFR) procedure, and the base station will configure the UE to monitor another beam.

SUMMARY

The present disclosure relates to the technical field of communications, and particularly relates to an information transmission method, an information transmission device, an electronic device and a computer-readable storage medium.

According to a first aspect of the embodiments of the present disclosure, an information transmission method is provided. The method is applicable to a user equipment (UE) and includes:

in response to initiating a beam failure recovery procedure to a cell, initiating a random access procedure to a base station through the cell; and in response to that a number of times that the random access procedure is initiated reaches a preset number and the random access procedure is not completed, transmitting indication information indicating that a problem exists in a cell group, to which the cell belongs, to the base station, wherein the indication information indicates that a cause for the problem existing in the cell group is failure of the random access procedure caused by the beam failure recovery procedure;

wherein the rlf-Cause of the indication information is set as beamFailureRecoveryFailure; wherein the rlf-Cause is configured to indicate that the failure of the random access procedure is caused by the beam failure recovery procedure According to a second aspect of the embodiments of the present disclosure, an information transmission device is provided. The device is applicable to a user equipment (UE) and includes:

a random access module, configured to initiate, in response to initiating a beam failure recovery procedure to a first cell, a random access procedure to a base station through a second cell, wherein the second cell is the first cell or a cell other than the first cell; and an indication transmission module, configured to transmit, in response to that a number of times that the random access procedure has been initiated reaches a preset number and the random access procedure is not completed, indication information indicating that a problem exists in a cell group, to which the second cell belongs, to the base station; wherein the indication information indicates that a cause for the problem existing in the cell group is failure of the random access procedure caused by the beam failure recovery procedure.

According to a third aspect of the embodiments of the present disclosure, an electronic device is provided. The electronic device is applicable to a user equipment (UE) and includes:

a processor; and a memory configured to store instructions executable by the processor.

The processor is configured to:

in response to initiating a beam failure recovery procedure to a cell, initiate a random access procedure to a base station through the cell; and in response to that a number of times that the random access procedure has been initiated reaches a preset number and the random access procedure is not completed, transmit indication information indicating that a problem exists in a cell group, to which the cell belongs, to the base station; wherein the indication information indicates that a cause for the problem existing in the cell group is failure of the random access procedure caused by the beam failure recovery procedure;

wherein the rlf-Cause of the indication information is set as beamFailureRecoveryFailure; wherein the rlf-Cause is configured to indicate that the failure of the random access procedure is caused by the beam failure recovery procedure.

According to a fourth aspect of the embodiments of the present disclosure, a computer-readable storage medium in which a computer program is stored, applicable to a user equipment (UE), is provided. The program, when executed by a processor, implement the following steps of:

in response to initiating a beam failure recovery procedure to a cell, initiating a random access procedure to a base station through the cell; and in response to that a number of times that the random access procedure has been initiated reaches a preset number and the random access procedure is not completed, transmitting indication information indicating that a problem exists in a cell group, to which the cell belongs, to the base station; wherein the indication information indicates that a cause for the problem existing in the cell group is failure of the random access procedure caused by the beam failure recovery procedure;

wherein the rlf-Cause of the indication information is set as beamFailureRecoveryFailure; wherein the rlf-Cause is configured to indicate that the failure of the random access procedure is caused by the beam failure recovery procedure.

BRIEF DESCRIPTION OF THE DRAWINGS

In order to more clearly illustrate the technical solutions in the embodiments of the present disclosure, the drawings to be used in the embodiment description will be briefly introduced below. It is apparent that the drawings in the following description are only some of the embodiments of the present disclosure, and those skilled in the art can obtain other drawings according to the drawings without any inventive labor.

DETAILED DESCRIPTION

The technical solutions in the embodiments of the present disclosure are more clearly and completely described below with reference to the drawings in the embodiments of the present disclosure. It is apparent that the described embodiments are only a part of the embodiments of the present disclosure, but are not all of the embodiments. All other embodiments obtained by those of ordinary skill in the art based on the embodiments of the present disclosure without creative efforts fall within the scope of protection of the embodiments of the present disclosure.

In related technologies, when the UE determines beam failure for a certain cell and the number of times of beam failure indicated by the physical layer reaches a preset number, the BFR procedure may be initiated through a random access procedure in this cell. When the number of times of initiating a random access procedure reaches a maximum preset number, the MAC layer will indicate occurrence of a problem in random access to a Radio Resource Control (RRC) layer, information may be reported to the base station subsequently, and the reported information indicates that there is a problem in a serving cell of the UE and the cause for the problem is random access.

At present, although the reported information may indicate that the cause for the problem in the serving cell of the UE is random access, it does not indicate whether the problem of random access is resulted from BFR or other causes. For the problem in random access resulted from BFR and the problem of random access problem resulted from other causes, the base station deals with them differently. Therefore, based on the information reported in the related technologies, the base station cannot accurately select a processing manner to process the problem occurring in the serving cell of the UE.

Figure 1:
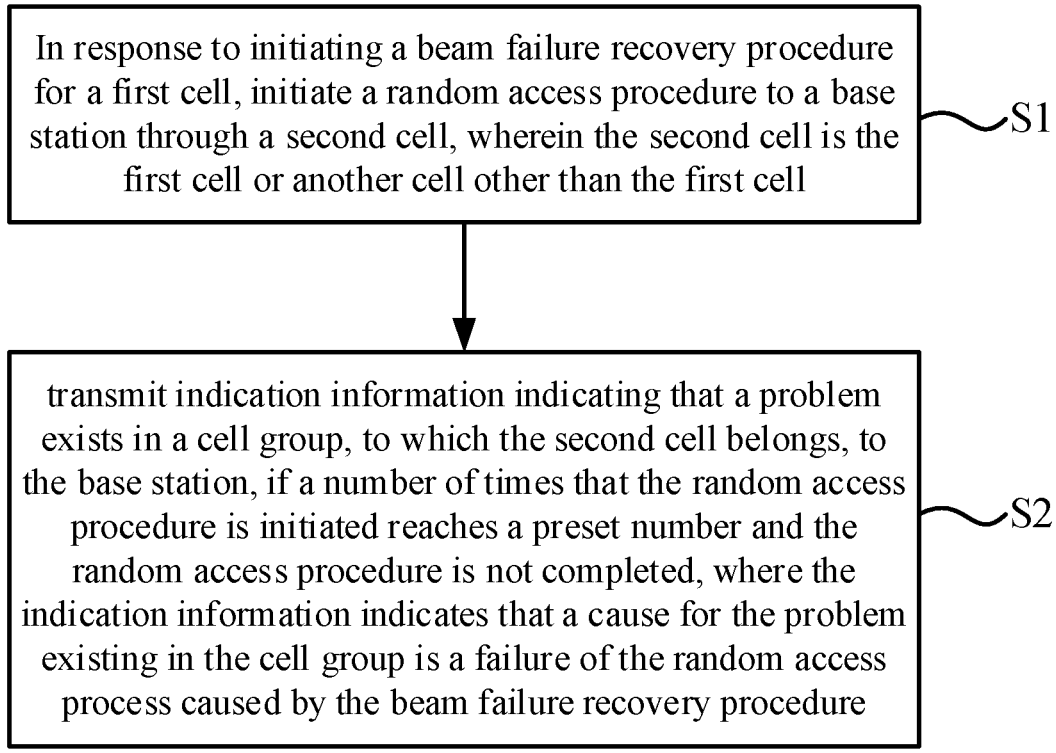
FIG. 1 is a schematic flow diagram of an information transmission method according to some embodiments of the disclosure.

FIG. 1 is a schematic flow diagram of an information transmission method according to some embodiments of the disclosure. The information transmission method shown in the present embodiment may be applied to a user equipment (UE), such as a mobile phone and a tablet computer. The user may use Long Term Evolution (LTE) communication or New Radio (NR) communication.

As shown in FIG. 1, the information transmission method may include the following steps:

In S1, a random access procedure is initiated to a base station through a second cell, when a beam failure recovery procedure is initiated for a first cell, wherein the second cell is the first cell or a cell other than the first cell.

In some embodiments, the UE may monitor the first cell for signal quality of beams. The base station may indicate a beam of a cell that the UE should monitor. If the signal quality (such as signal strength) of the monitored beam(s) is lower than the preset signal quality, the physical layer of the UE may indicate beam failure to an MAC layer. When the number of times of beam failure indicated by the physical layer reaches a certain number, the MAC layer may trigger a beam failure recovery procedure.

In the beam failure recovery procedure, the UE may initiate a random access procedure to the base station through the first cell, or may initiate a random access procedure to the base station through a cell other than the first cell. If the first cell is a primary cell (PCell) or a primary secondary cell (PSCell) among the serving cells of the UE, the user equipment may initiate a random access procedure to the base station through the first cell. If the first cell is a serving cell other than the primary cell and the primary secondary cell among the serving cells of the UE, the UE may initiate a random access procedure to the base station through a cell other than the first cell, such as the primary cell or the primary secondary cell.

In S2, indication information indicating that a problem exists in a cell group, to which the second cell belongs, is transmitted to the base station, if the number of times that the random access procedure is initiated reaches a preset number and the random access procedure is not completed, where the indication information indicates that the cause for a problem existing in the cell group is a failure of the random access caused by the beam failure recovery procedure.

In some embodiments, if the number of time that the random access procedure is initiated by the UE to the base station through the second cell reaches a preset number and the random access procedure is not completed, for example, if the number of times that a preamble for random access is sent by the UE to the base station through a first message (MSG1) in the random access procedure reaches a preset number, and the base station does not feed back a second message (MSG2) in the random access procedure, the UE may transmit indication information to the base station, so that the base station learns that there is a problem in the cell group, to which the second cell belongs.

The indication information further indicates that the cause for a problem existing in the cell group is failure of the random access caused by the beam failure recovery procedure, so that the base station may determine the cause for the failure of the random access, and ensure reasonability of subsequent configuration of the base station. For example, for the failure of the random access not caused by the beam failure recovery procedure, only the parameters of a Physical Uplink Control Channel (PUCCH) of the second cell may be reconfigured. For the failure of the random access caused by the beam failure recovery procedure, not only parameters reconfiguration of the PUCCH of the second cell is performed, but also beam reconfiguration is performed (for example, the UE is configured to monitor beams of cells other than the first cell).

Figure 2:
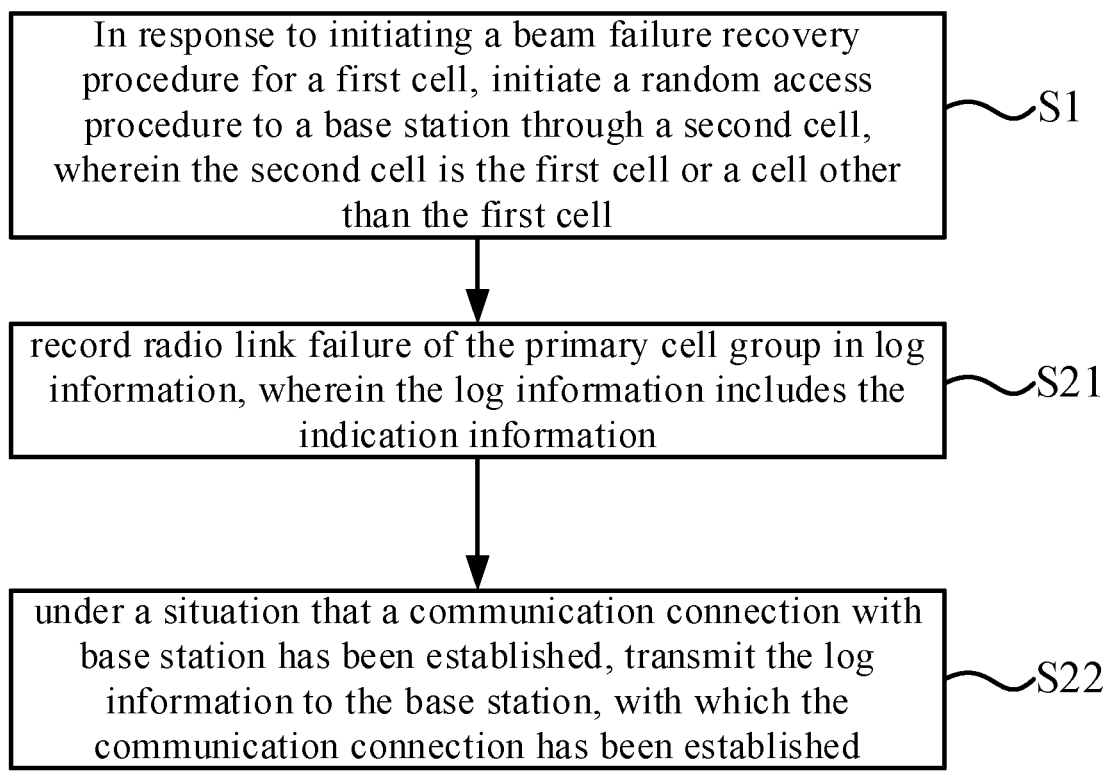
FIG. 2 is a schematic flow diagram of another information transmission method according to some embodiments of the disclosure.

FIG. 2 is a schematic flow diagram of another information transmission method according to some embodiments of the disclosure. As shown in FIG. 2, on the basis of the embodiment shown in FIG. 1, the second cell is a primary cell, the cell group is a primary cell group, and the step of transmitting indication information indicating that a problem exists in a cell group, to which the second cell belongs, to the base station includes:

In S21, radio link failure of the primary cell group is recorded in log information, wherein the log information includes the indication information.

In S22, under a situation that a communication connection with the base station has been established, the log information is transmitted to the base station with which the communication connection is established.

In some embodiments, if the number of times that the random access procedure is initiated by the UE to the base station through the primary cell reaches a preset number, and the random access procedure is not completed, at this time, the communication connection between the UE and the base station is disconnected. Therefore, log information of Radio Link Failure (RLF) of a Master Cell Group (MCG), to which the primary cell belongs, may be recorded firstly. The log information may include the indication information, and may also include other information, such as the position and the speed of the UE.

In some embodiments, the situation that a communication connection has been established between the UE and the base station includes: the UE establishes the communication connection with the base station, or the UE recoveries the communication connection with the base station. In these two situations, the UE may send a notification to the base station to notify the base station that the UE has recorded the radio link failure in the log information. After receiving the notification, the base station may send a request for acquiring the log information to the UE. After receiving the request, the UE transmits the log information to the base station, so that the base station determines, according to the indication information in the log information, that the cause for a problem existing in the primary cell group is the failure of the random access caused by the beam failure recovery procedure.

It is to be noted that the base station with which the UE has established the communication connection may be the base station which indicates a beam of a cell that the UE should monitor in the embodiment shown in FIG. 1, or may be another base station.

In some embodiments, the indication information is represented by a first preset value of a cause field of radio link failure of the primary cell group.

In some embodiments, in the case of radio link failure of the primary cell group, the cause for the radio link failure may be represented by the cause field of radio link failure. The Radio Link Failure-cause (RLF-Cause) field may be included in a VarRLF-Report variable, and the VarRLF-Report variable is configured to store information of radio link failure or handover failure. The indication information indicates that the cause for a problem existing in the primary cell group is the failure of the random access caused by the beam failure recovery procedure, the indication information being different from information represented by the cause field of radio link failure in related technologies. Therefore, through the value of the cause field of radio link failure different from that in the related technologies, that is, relative to the RLF-Cause field in the related technologies, one more value (i.e., a first preset value) may be set, and the indication information is represented by the first preset value.

Figure 3:
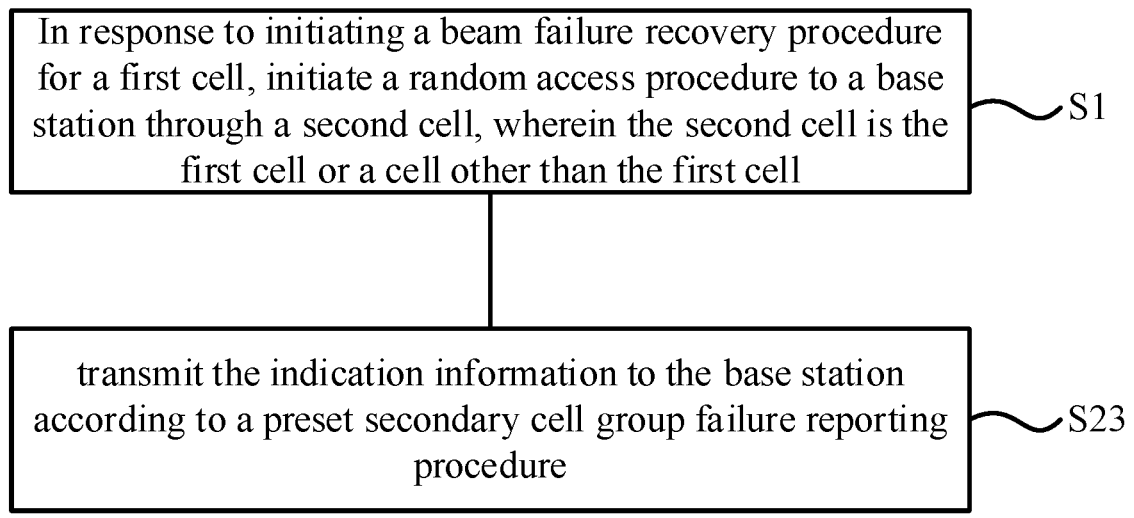
FIG. 3 is a schematic flow diagram of another information transmission method according to some embodiments of the disclosure.

FIG. 3 is a schematic flow diagram of another information transmission method according to some embodiments of the disclosure. As shown in FIG. 3, on the basis of the embodiment shown in FIG. 1, the second cell is a primary secondary cell, the cell group is a secondary cell group, and the step of transmitting indication information indicating that a problem exists in a cell group, to which the second cell belongs, to the base station includes the following step S23.

In S23, the indication information is transmitted to the base station according to a preset secondary cell group failure reporting procedure.

In some embodiments, if the number of time that the random access procedure has been initiated by the UE to the base station through the primary secondary cell reaches a preset number, and the random access procedure is not completed, there may still be a communication connection between the UE and the base station. Therefore, the indication information may be transmitted to the base station according to a preset secondary cell group (SCG) failure reporting procedure.

The preset secondary cell group failure reporting procedure may be pre-configured by the base station. For example, the base station may configure what are to be transmitted to the base station and a sequence in which they are to be transmitted, when the UE determines the secondary cell group failure. This is not the main inventive point of the present disclosure and will not be described here.

In some embodiments, the indication information is represented by a second preset value of a type field in a secondary cell group failure report.

In some embodiments, in the case of secondary cell group failure (such as radio link failure), the cause for radio link failure may be represented by the failure Type field in the secondary cell group failure report. The indication information indicates that the cause for a problem existing in the secondary cell group is the failure of the random access which is caused by the beam failure recovery procedure, the indication information being different from information represented by the type field in the secondary cell group failure report in related technologies. Therefore, through the value of the type field in the secondary cell group failure report different from that in the related technologies, that is, relative to the failure Type field corresponding to the related technologies, one more value, (i.e., a second preset value) may be set, and the indication information is represented by the second preset value.

Corresponding to the embodiments of the above information transmission method, the present disclosure further provides embodiments of an information transmission device.

Figure 4:
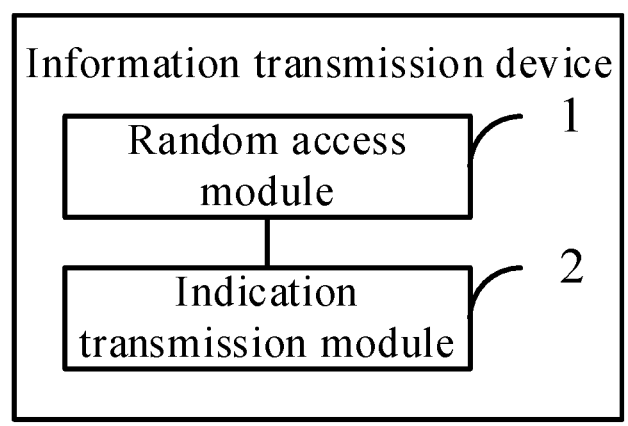
FIG. 4 is a schematic block diagram of an information transmission device according to some embodiments of the disclosure.

FIG. 4 is a schematic block diagram of an information transmission device according to some embodiments of the disclosure. The information transmission device shown in the present embodiment may be applied to a UE, such as a mobile phone and a tablet computer. The user may apply an LTE communication or an NR communication.

As shown in FIG. 4, the information transmission device may include:

a random access module 1, configured to initiate, in response to initiating a beam failure recovery procedure to a first cell, a random access procedure to a base station through a second cell, wherein the second cell is the first cell or a cell other than the first cell; and an indication transmission module 2, configured to transmit, in response to that a number of times that the random access procedure has been initiated reaches a preset number and the random access procedure is not completed, indication information indicating that a problem exists in a cell group, to which the second cell belongs, to the base station; wherein the indication information indicates that a cause for the problem existing in the cell group is failure of the random access procedure caused by the beam failure recovery procedure.

Figure 5:
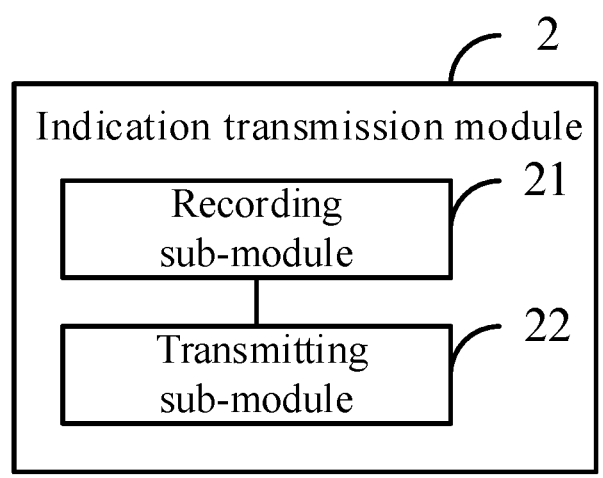
FIG. 5 is a schematic block diagram of an indication transmission module according to some embodiments of the disclosure.

FIG. 5 is a schematic block diagram of an indication transmission module according to some embodiments of the disclosure. The second cell is a primary cell, the cell group is a primary cell group, and the indication transmission module 2 includes:

a recording sub-module 21, configured to record radio link failure of the primary cell group in log information, where the log information includes the indication information; and a transmitting sub-module 22, configured to transmit, under a situation that a communication connection with a base station has been established, the log information to the base station with which the communication connection has been established.

In some embodiments, the indication information is represented by a first preset value of a cause field of radio link failure of the primary cell group.

In some embodiments, the second cell is a primary secondary cell, the cell group is a secondary cell group, and the indication transmission module is configured to transmit the indication information to the base station according to a preset secondary cell group failure reporting procedure.

In some embodiments, the indication information is represented by a second preset value of a type field in a secondary cell group failure report.

With respect to the device in the above embodiment, the specific manners for performing operations for individual modules therein have been described in detail in the embodiment regarding the method, which will not be elaborated herein.

For the device embodiments, reference will now be made in part to the description of the method embodiments since they substantially correspond to the method embodiments. The device embodiments described above are merely illustrative, in that modules illustrated as separate elements may or may not be physically separate, and in that elements shown as modules may or may not be physical units, i.e., may be located at one place, or may be distributed on a plurality of network units. Some or all of the modules can be selected according to actual needs to achieve the purpose of the scheme of the embodiments. Those ordinarily skilled in the art would understand and practice without involving any inventive effort.

Some embodiments of the present disclosure further provide an electronic device. The electronic device is applicable to a UE and includes:

a processor; and a memory configured to store executable instructions of the processor.

The processor is configured to:

in response to initiating a beam failure recovery procedure to a first cell, initiate a random access procedure to a base station through a second cell, wherein the second cell is the first cell or a cell other than the first cell; and in response to that a number of times that the random access procedure has been initiated reaches a preset number and the random access procedure is not completed, transmit indication information indicating that a problem exists in a cell group, to which the second cell belongs, to the base station; wherein the indication information indicates that a cause for the problem existing in the cell group is failure of the random access procedure caused by the beam failure recovery procedure.

Some embodiments of the present disclosure further provide a computer-readable storage medium in which a computer program is stored, applicable to a UE. When the program is executed by a processor, the following steps are implemented:

in response to initiating a beam failure recovery procedure to a first cell, initiating a random access procedure to a base station through a second cell, wherein the second cell is the first cell or a cell other than the first cell; and in response to that a number of times that the random access procedure has been initiated reaches a preset number and the random access procedure is not completed, transmitting indication information indicating that a problem exists in a cell group, to which the second cell belongs, to the base station; wherein the indication information indicates that a cause for the problem existing in the cell group is failure of the random access procedure caused by the beam failure recovery procedure.

Figure 6:
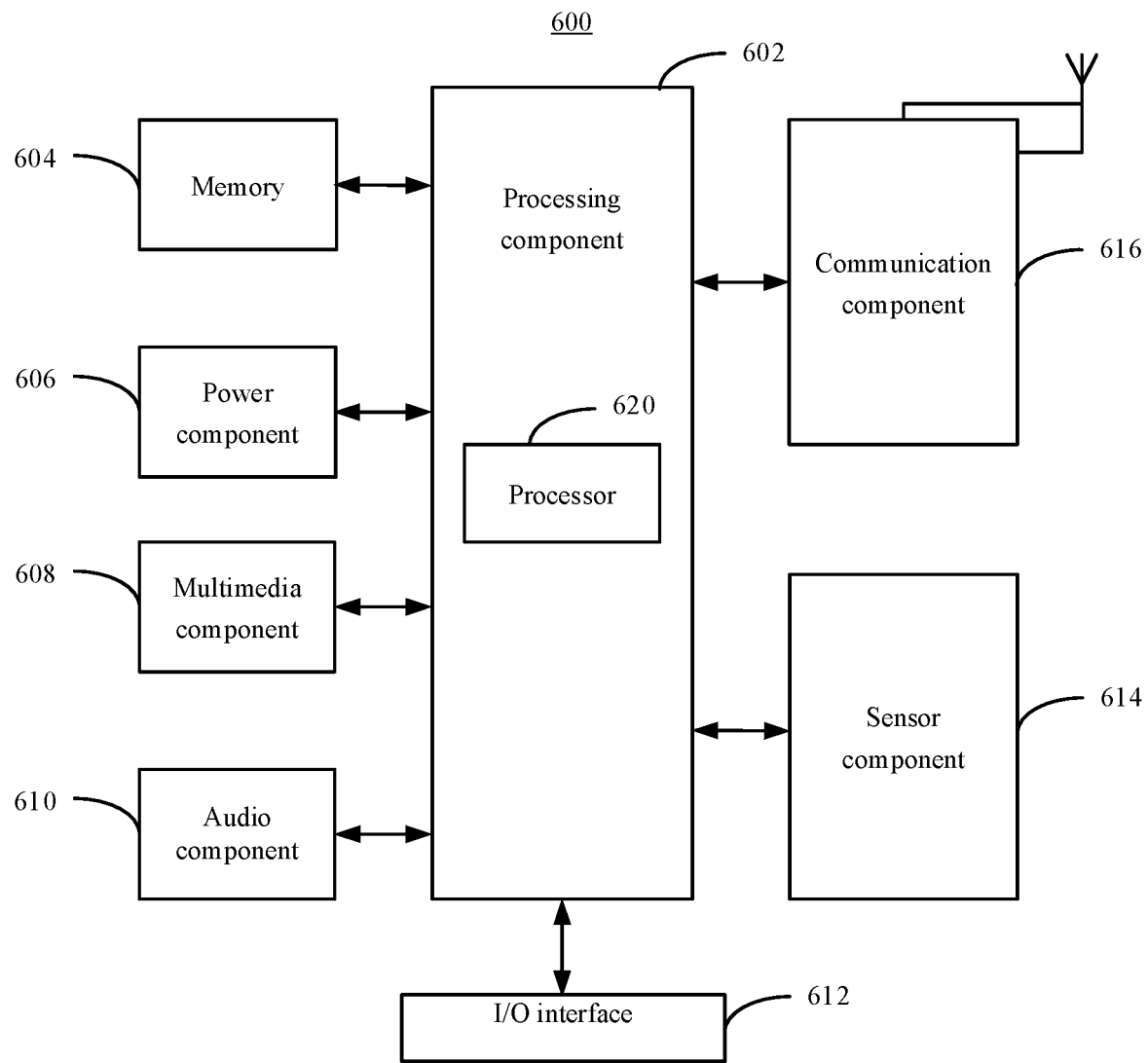
FIG. 6 is a schematic block diagram of a device for information transmission according to some embodiments.

FIG. 6 is a schematic block diagram of a device 600 for information transmission according to some embodiments. For example, the device 600 may be a mobile phone, a computer, a digital broadcasting terminal, a message transceiver device, a game console, a tablet device, a medical device, a fitness device, a personal digital assistant, and the like.

Referring to FIG. 6, the device 600 may include one or a plurality of following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to complete all or part of the steps of the method described above. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support the operations at the device 600. Examples of such data include instructions for any applications or methods operated on the device 600, contact data, phonebook data, messages, pictures, video, etc. The memory 604 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 606 provides power for various components of the device 600. The power component 606 may include a power management system, one or more power supplies, and other components associated with generating, managing, and distributing power for the device 600.

The multimedia component 608 includes a screen that provides an output interface between the device 600 and a user. In some embodiments, the screen may include a Liquid Crystal Display (LCD) and a touch panel (TP). In some implementations, an organic light-emitting diode (OLED) display screen can be employed.

If the screen includes the TP, the screen may be implemented as a touch screen to receive an input signal from the user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 608 includes a front camera and/or a rear camera. When the device 600 is in an operation mode, such as a photographing mode or a video mode, the front camera and/or the rear camera may receive external multimedia data. Each front camera and each rear camera may be fixed optical lens systems or may have focal lengths and optical zoom capabilities.

The audio component 610 is configured to output and/or input audio signals. For example, the audio component 610 includes a microphone (MIC) configured to receive external audio signals when the device 600 is in an operation mode, such as a call mode, a recording mode and a voice recognition mode. The received audio signals may be further stored in the memory 604 or transmitted via the communication component 616. In some embodiments, the audio component 610 may further include a speaker to output audio signals.

The I/O interface 612 provides an interface between the processing component 602 and peripheral interface modules, such as a keyboard, a click wheel and buttons. These buttons may include, but not limited to: a home button, a volume button, a start button, and a lock button.

The sensor component 614 includes one or more sensors to provide status assessments of various aspects of the device 600. For example, the sensor component 614 may detect an on/off state of the device 600 and a relative position of components. For example, the components are a display and a keypad of the device 600. The sensor component 614 may further detect a position change of the device 600 or one component of the device 600, the presence or absence of user contact with the device 600, orientation or acceleration/deceleration of the device 600, and temperature variations of the device 600. The sensor component 614 may include a proximity sensor configured to detect the presence of objects nearby without any physical contact. The sensor component 614 may also include light sensors, such as CMOS or CCD image sensors, for use in imaging applications. In some embodiments, the sensor component 614 may also include an acceleration sensor, a gyroscope sensor, a magnetic sensor, a pressure sensor, or a temperature sensor.

The communication component 616 is configured to facilitate wired or wireless communication between the device 600 and other devices. The device 600 may access a wireless network based on a communication standard, such as Wi-Fi, 2G, 3G, 4G, 5G, or a combination thereof. In one exemplary embodiment, the communication component 616 receives broadcast signals or broadcast related information from an external broadcast management system via a broadcast channel. In one exemplary embodiment, the communication component 616 further includes an NFC module to facilitate short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In exemplary embodiments, the device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, micro-processors, or other electronic components, for performing the information transmission method described in any of the above embodiments.

In exemplary embodiments, a non-temporary computer-readable storage medium including instructions, such as included in the memory 604, executable by the processor 620 in the device 600, for performing the above-described methods is further provided. For example, the non-transitory computer-readable storage medium may be an ROM, an RAM, a CD-ROM, a magnetic tape, a floppy disk, an optical data storage device, and the like.

According to the embodiments of the present disclosure, if the number of time that the random access procedure is initiated by the UE to the base station reaches the preset number and the random access procedure is not completed, the UE may transmit the indication information to the base station, so that the base station learns that there is a problem in the cell group, to which the second cell belongs. The indication information further indicates that the cause for a problem existing in the cell group is the failure of the random access procedure caused by the initiation of the beam failure recovery procedure, so that the base station may determine the cause for the failure of random access, and the reasonability of subsequent configuration of the base station may be ensured.

Other embodiments of the disclosure will readily occur to those skilled in the art upon consideration of the specification and practice of the disclosure disclosed herein. The present disclosure is intended to cover any variation, use or adaptation of the disclosure, which follows the general principles of the disclosure and includes common knowledge or conventional technical means in the technical field not disclosed in the disclosure. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

It should be noted that in this document, relational terms such as first and second, and the like are used solely to distinguish one entity or operation from another entity or operation without necessarily requiring or implying any such actual relationship or order between such entities or operations. The terms 'includes', 'including", or any other variations thereof, are intended to cover a non-exclusive inclusion, such that a process, method, article, or equipment that includes a list of elements not only includes those elements but also may include other elements not expressly listed or inherent to such process, method, article, or equipment. An element defined by the phrase 'includes one . . . ' does not, without more constraints, preclude the existence of additional identical elements in the process, method, article, or equipment that includes the element.

The method and device provided by the embodiments of the disclosure have been described in detail above. In the disclosure, specific embodiments are used to explain the principles and implementation manners of the disclosure. The descriptions of the above embodiments are only used to help understand the method of the disclosure and the core idea thereof. At the same time, for those of ordinary skill in the art, according to the idea of the disclosure, there will be changes in specific implementation manners and application scope. In conclusion, the contents of this specification should not be construed as limiting the disclosure.

What is claimed is:

1. An information transmission method, performed by a user equipment (UE), the method comprising:
   initiating a beam failure recovery procedure to a cell;

initiating a random access procedure to a base station through the cell; and transmitting indication information indicating that a problem exists in a cell group, to which the cell belongs, to the base station;

wherein a number of times that the random access procedure has been initiated reaches a preset number and the random access procedure is not completed; the indication information indicates that a cause for the problem existing in the cell group is failure of the random access procedure caused by the beam failure recovery procedure;

wherein Radio Link Failure-Cause (rlf-Cause) of the indication information is set as beamFailureRecovery-Failure; wherein the rlf-Cause is configured to indicate that the failure of the random access procedure is caused by the beam failure recovery procedure, wherein the cell is a primary cell, the cell group is a primary cell group, and transmitting indication information indicating that a problem exists in a cell group, to which the cell belongs, to the base station comprises:

recording radio link failure of the primary cell group in log information, wherein the log information comprises the indication information.

2. The method of claim 1, wherein transmitting indication information indicating that a problem exists in a cell group, to which the second cell belongs, to the base station further comprises:

under a situation that a communication connection with the base station has been established, transmitting the log information to the base station.

3. The method of claim 2, wherein the indication information is represented by a first preset value of a cause field of the radio link failure of the primary cell group.

4. The method of claim 1, wherein the cell is a primary secondary cell, the cell group is a secondary cell group, and transmitting indication information indicating that a problem exists in a cell group, to which the second cell belongs, to the base station comprises:

transmitting the indication information to the base station according to a preset secondary cell group failure reporting procedure.

5. The method of claim 4, wherein the indication information is represented by a second preset value of a type field in a secondary cell group failure report.

6. The method of claim 1, wherein the indication information is stored as Variable Radio Link Failure-Report (VarRLF-Report) parameter.

7. A user equipment (UE), comprising:
a processor, and
a memory configured to store instructions executable by the processor,
wherein the processor is configured to:
initiate a beam failure recovery procedure to a cell;
initiate a random access procedure to a base station through the cell; and
transmit indication information indicating that a problem exists in a cell group, to which the cell belongs, to the base station;
wherein a number of times that the random access procedure has been initiated reaches a preset number and the random access procedure is not completed; the indication information indicates that a cause for the problem existing in the cell group is failure of the random access procedure caused by the beam failure recovery procedure;

wherein Radio Link Failure-Cause (rlf-Cause) of the indication information is set as beamFailureRecovery-Failure; wherein the rlf-Cause is configured to indicate that the failure of the random access procedure is caused by the beam failure recovery procedure, wherein the cell is a primary cell, the cell group is a primary cell group, and transmitting indication information indicating that a problem exists in a cell group, to which the cell belongs, to the base station comprises:

recording radio link failure of the primary cell group in log information, wherein the log information comprises the indication information.

8. The UE of claim 7, wherein transmitting indication information indicating that a problem exists in a cell group, to which the cell belongs, to the base station further comprises:

under a situation that a communication connection with the base station has been established, transmitting the log information to the base station.

9. The UE of claim 8, wherein the indication information is represented by a first preset value of a cause field of the radio link failure of the primary cell group.

10. The UE of claim 7, wherein the cell is a primary secondary cell, the cell group is a secondary cell group, and in transmitting indication information indicating that a problem exists in a cell group, to which the cell belongs, to the base station, the processor is configured to:

transmit the indication information to the base station according to a preset secondary cell group failure reporting procedure.

11. The UE of claim 10, wherein the indication information is represented by a second preset value of a type field in a secondary cell group failure report.

12. The UE of claim 7, wherein the indication information is stored as Variable Radio Link Failure-Report (VarRLF-Report) parameter.

13. A non-transitory computer-readable storage medium in which a computer program is stored, wherein the program, when executed by a processor, implements the following steps of:

initiating a beam failure recovery procedure to a cell;
initiating a random access procedure to a base station through the cell; and
transmitting indication information indicating that a problem exists in a cell group, to which the cell belongs, to the base station;
wherein a number of times that the random access procedure has been initiated reaches a preset number and the random access procedure is not completed; the indication information indicates that a cause for the problem existing in the cell group is failure of the random access procedure caused by the beam failure recovery procedure;
wherein Radio Link Failure-Cause (rlf-Cause) of the indication information is set as beamFailureRecovery-Failure; wherein the rlf-Cause is configured to indicate that the failure of the random access procedure is caused by the beam failure recovery procedure,
wherein the cell is a primary cell, and the cell group is a primary cell group, wherein the program, when executed by the processor, further implements:
recording radio link failure of the primary cell group in log information, wherein the log information comprises the indication information.

14. The non-transitory computer-readable storage medium of claim 13, wherein the program, when executed by the processor, further implements under a situation that a communication connection with the base station has been established, transmitting the log information to the base station.

15. The non-transitory computer-readable storage medium of claim 14, wherein the indication information is represented by a first preset value of a cause field of the radio link failure of the primary cell group.

16. The non-transitory computer-readable storage medium of claim 13, wherein the cell is a primary secondary cell, and the cell group is a secondary cell group, wherein the program, when executed by the processor, further implements the following step of:
transmitting the indication information to the base station according to a preset secondary cell group failure reporting procedure.

17. The non-transitory computer-readable storage medium of claim 16, wherein the indication information is represented by a second preset value of a type field in a secondary cell group failure report.

18. The non-transitory computer-readable storage medium of claim 13, wherein the indication information is stored as Variable Radio Link Failure-Report (VarRLF-Report) parameter.

* * * * *